United States Patent Office 3,429,389
Patented Feb. 25, 1969

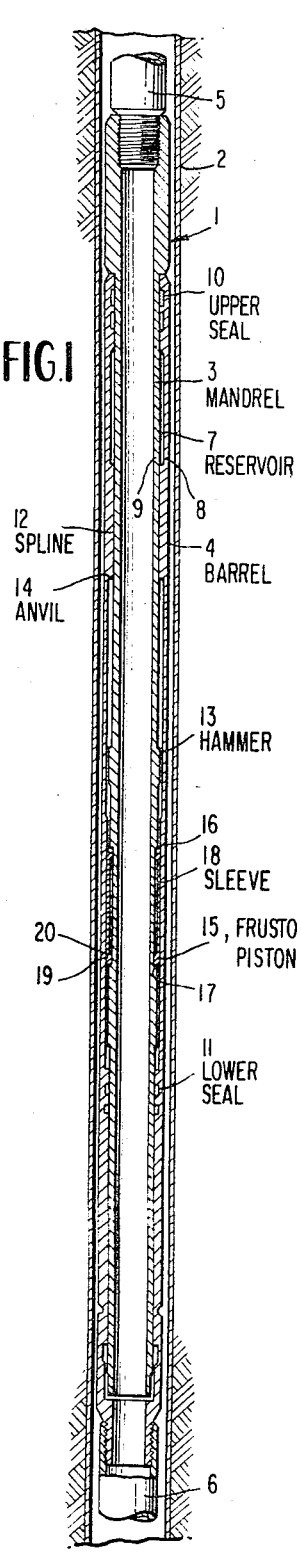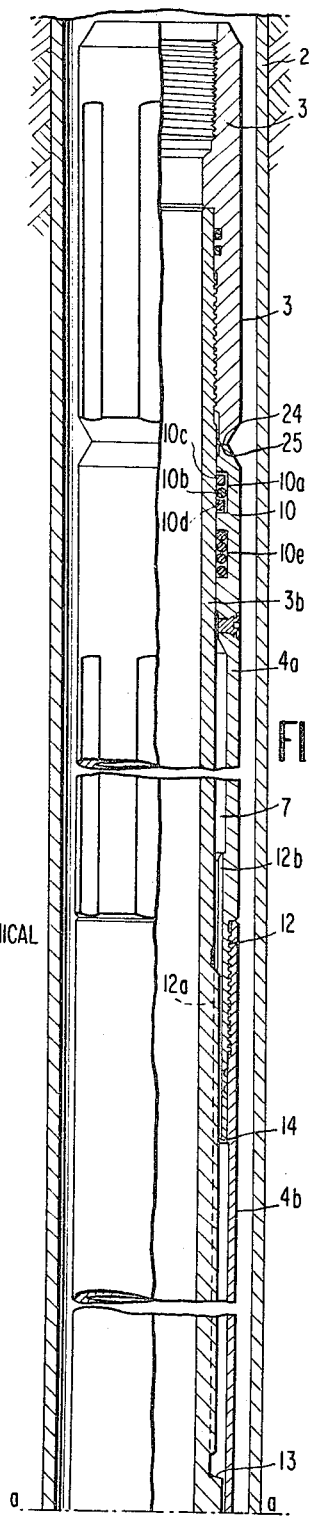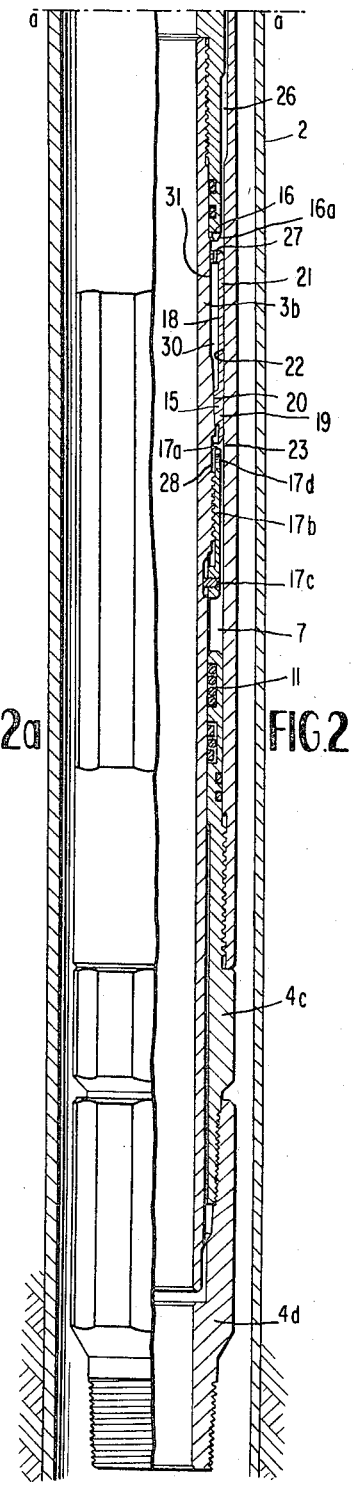

3,429,389
PRESSURE MAINTENANCE MECHANISM FOR HYDRAULIC JAR TOOL AND MODE OF OPERATION THEREOF
Burchus Q. Barrington, % Halliburton Company,
P.O. Drawer 1431, Duncan, Okla. 73533
Filed Dec. 14, 1967, Ser. No. 690,673
U.S. Cl. 175—297                 8 Claims
Int. Cl. E21b *1/10*

ABSTRACT OF THE DISCLOSURE

A jar tool including a mandrel telescopically mounted within a barrel and a fluid reservoir interposed between the mandrel and barrel. A sleeve, slidably mounted on the mandrel within the reservoir, serves to initially provide a seal between the mandrel and the barrel as a relatively low pressure is developed within the reservoir. As pressure within the reservoir is intensified to a high level, the sleeve separates from the mandrel to provide a restricted flow passage enabling movement of the mandrel to proceed on a highly impeded basis.

---

Figure 3A:
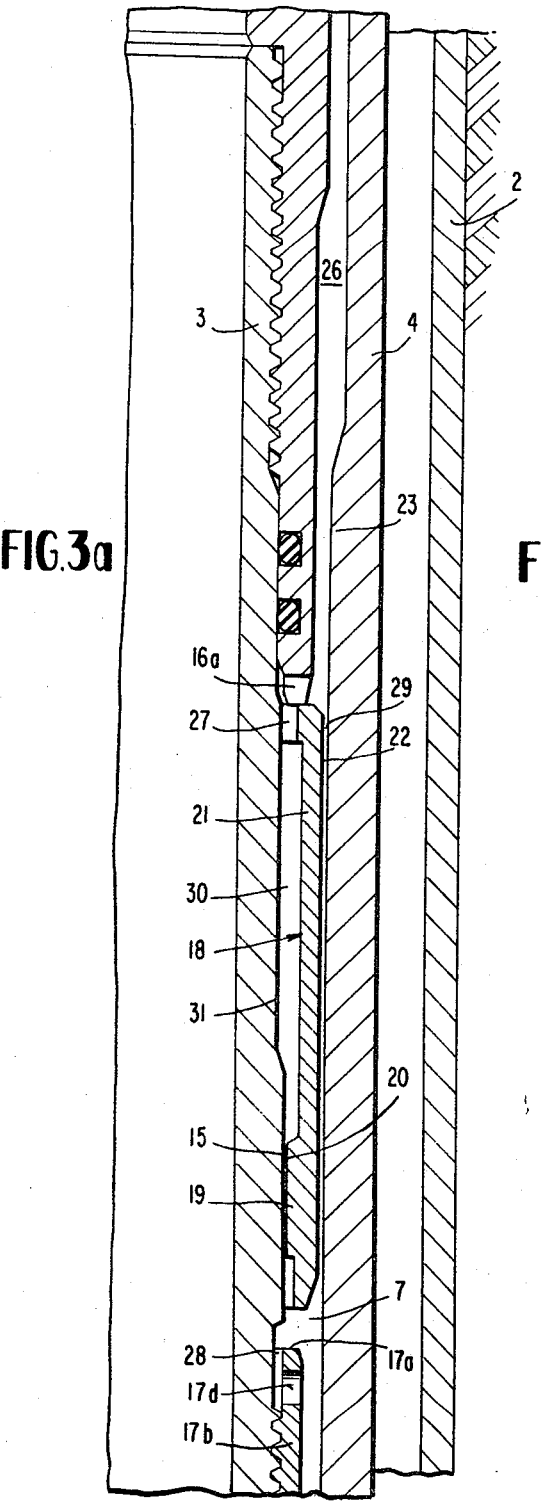

This invention relates to apparatus and method aspects of an improved mechanism for creating and maintaining high pressure within the fluid reservoir of a hydraulic jar tool used in wells.

A method of supporting a pressure-generating and mandrel-movement impeding device within the fluid reservoir of a hydraulic jar tool. This method comprises elastically and yieldably expanding a portion of a pressure-generating device within a fluid reservoir of a hydraulic jar tool. The expanded portion is sealingly engaged with a portion of the mandrel of the jar tool. In this posture of sealing engagement, the expanded portion is contractable into tighter engagement with the mandrel in response to a reduction of pressure within the reservoir. Thereafter the pressure of fluid within the reservoir is increased. In response to this pressure increase, the portion is separated away from the mandrel. The mandrel and separated portion are then moved together through a portion of the reservoir. The pressure within the reservoir is reduced and, in response to this pressure reduction, the portion is contracted into tight-fitting engagement with the mandrel. The contracted portion is thereafter jarred free from its tight-fitting engagement with the mandrel.

General background and objects of invention

In United States Barrington Patent 3,399,740, a novel and improved jar tool structure is disclosed. This structure is characterized by a movement impedance mechanism supported on one of two telescopically assembled components, and movable through a fluid body interposed between these components. This movement impedance mechanism comprises a frustoconical, restricted passageway through which fluid must flow in order to enable movement of one of the components to take place. The various advantages attendant upon this novel structure are described in detail in this earlier application.

These advantages notwithstanding, it has been discovered that the creating and maintenance of high fluid pressure within this jar tool, so as to improve the intensification of jarring action, may be effected. Specifically, it has been discovered that a pressure responsive seal between movable components, in the area where they are slidably engaged, serves to reduce or substantially eliminate fluid by-passing. Such by-passing would reduce, undesirably, the level of fluid pressure within the reservoir of the jarring tool.

Additionally, it has been discovered that by providing a restricted passageway which controls component movements and which is closed at relatively low pressure and which opens and remains open, only in response to relatively high pressure, the intensity of jarring force resulting from such movement is improved.

Assume, for example, that a mandrel of a jar tool is connected with a well string extending to a well head and that a barrel of the jar tool is connected with an object temporarily stuck in a well bore. In a tool of this nature upward movement of the mandrel is initially resisted by fluid pressure so as to build up a high lifting force. This high lifting force should be maintained as the mandrel moves slowly upward to a release point. At this release point, the fluid pressure, resisting mandrel movement, is by-passed and the mandrel then moves rapidly upward to bring a mandrel-carried hammer into jarring impact with a barrel-mounted anvil. By holding the initial impedance-to-mandrel movement, as provided by the fluid pressure, at a high and consistent level, it is possible to maximize the intensity of the hammer blows.

Accordingly, it is a principal object of the invention to provide an improved seal between the mandrel-carried components of a jar tool and barrel components with which they are telescopically engaged.

It is likewise a principal object of the invention to provide a mechanism which provides a seal between a barrel and mandrel of a jar tool so long as low pressure exists within the jar tool reservoir and which separates from the mandrel to provide a restricted passageway only after a high pressure condition has been attained within this reservoir. This insures that a pulling force imposed on the mandrel will have to reach a high level so as to generate high pressure within the reservoir and provide the restricted passageway which will enable mandrel movement to take place.

It is also an object of the invention to provide a novel method for supporting a pressure generating and movement impeding mechanism on the mandrel of the jar tool.

Summary of invention

As above indicated, this invention is directed to aspects of a hydraulic jarring tool used in wells to retrieve stuck or lodged articles. Specifically, the invention is concerned with an improved mechanism for maintaining fluid pressure within a body of fluid contained by the jar tool. This body of fluid serves to impede telescoping movement of tool components.

The mechanism includes a first member and a second member telescopically mounted in relation to the first member. A fluid reservoir means is contained between these two telescopically assembled members. A piston means is carried by one of these two members. First, radially distensible wall means disposed within the reservoir means is operable to distort radially in response to the attainment of a relatively high fluid pressure within the reservoir means. Second, radially, distensible wall means carried by the piston means is disposed in telescoping relation with the first wall means and is operable to distort radially into sealing engagement with the first wall means in response to the attainment of relatively low fluid pressure within the reservoir means. Pressure generating means carried by the piston means is connected with the second wall means. This pressure generating means is operable to sealingly engage the piston means when exposed to relatively low fluid pressure. Additionally, this pressure generating means is operable to distort away from the piston means in response to attainment of relatively high fluid pressure and the aforesaid distortions of the first wall means to define restricted means. This restricted passage means communicates with opposite ends of the piston means within the reservoir means to enable impeded movement of the piston means to take place.

An independently significant method facet of the invention relates to a technique for supporting a pressure-generating and movement-impedance device within the fluid reservoir of a hydraulic jar tool.

As indicated earlier in the Abstract of the Disclosure, this method facet of the invention entails the elastically yieldable expansion of a pressure-generating device, followed by its sealing engagement with a movable component of the jar tool. This sealing engagement, in turn, is followed by pressure-induced separation of the portion and component. After the separated portion and component have moved together through a portion of the reservoir, the portion is contracted into tight-fitting engagement with the movable component. Thereafter the contracted portion is jarred free from the movable component.

Drawings

In describing the invention reference will be made to a preferred embodiment illustrated in the accompanying drawings.

Figure 3B:
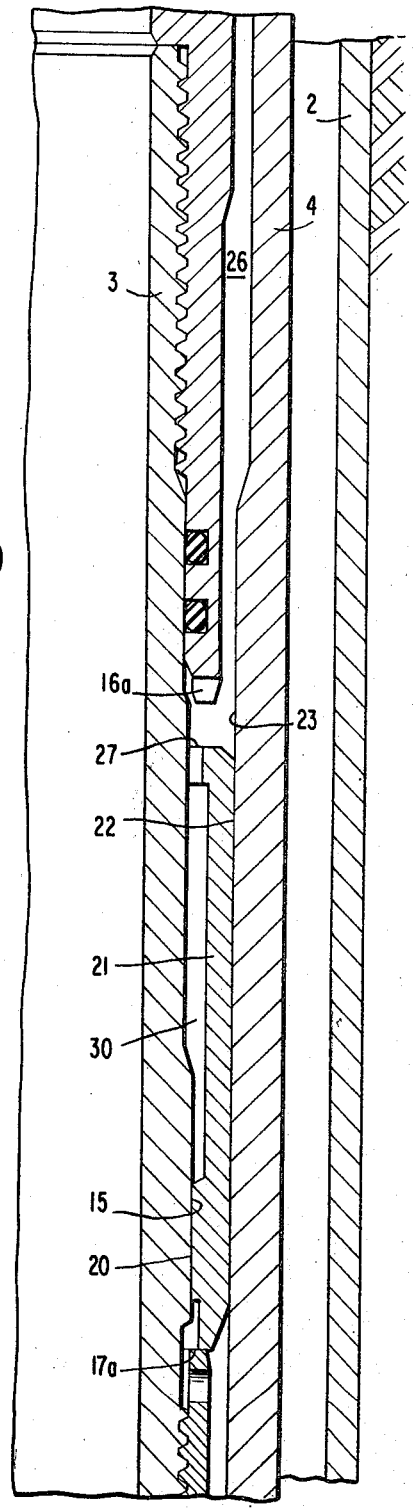
Figure 3C:
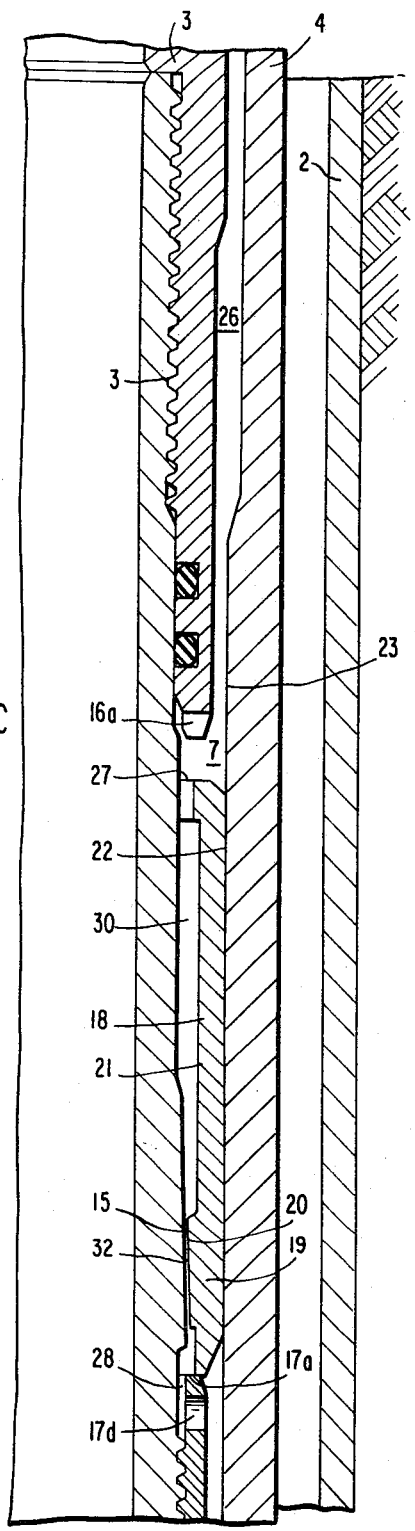
Figure 3D:
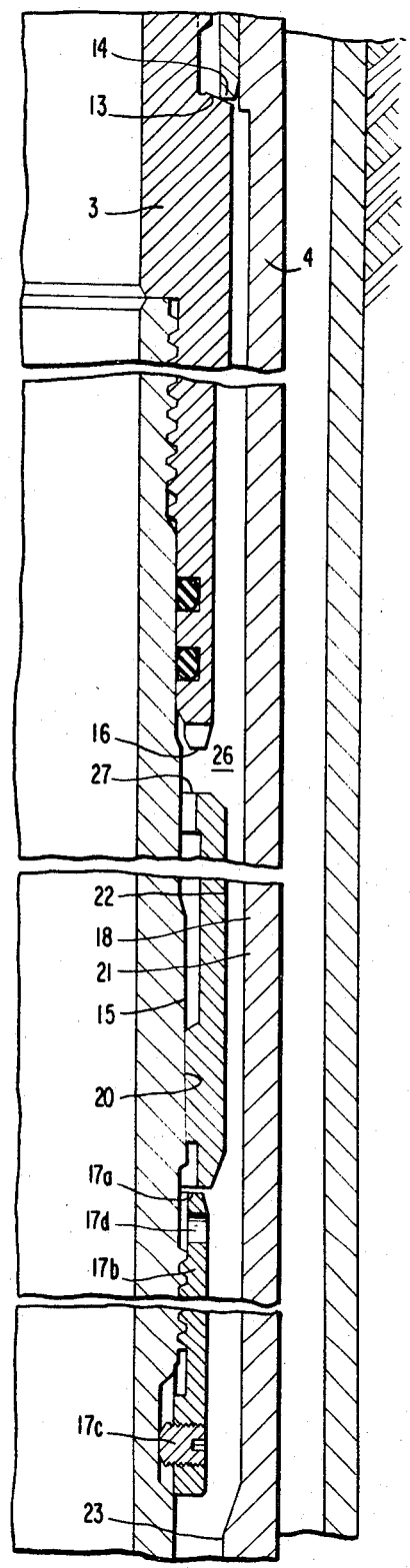

In the drawings:

FIGURE 1 schematically illustrates a complete jar tool disposed in a well bore, and vertically sectioned to reveal the axial relationships between its basic components;

FIGURES 2a and 2b, joined along the dividing line a—a, provide an enlarged, partially sectioned view of the FIGURE 1 tool;

FIGURE 3a provides a still further enlarged, vertically sectioned, and fragmentary view of the FIGURE 1 tool, illustrating the disposition of the components of a movement impedance mechanism after the tool mandrel has been returned to its lower position in preparation for a subsequent, upper jar stroke;

FIGURE 3b provides a still further enlarged, vertically sectioned, and fragmentary view of the FIGURE 1 tool, illustrating the disposition of the components of the movement-impedance mechanism during the beginning of the up stroke, when relatively low pressure has been attained within the fluid reservoir of the tool;

FIGURE 3c provides a still further enlarged, vertically sectioned, and fragmentary view of the FIGURE 1 tool, illustrating the disposition of the components of the movement-impedance mechanism during a mid-portion of the upper stroke of the tool mandrel, after a relatively high pressure condition has been attained within the fluid reservoir; and FIGURE 3d provides a still further enlarged, vertically sectioned, and fragmentary view of the FIGURE 1 tool, illustrating the disposition of the components of the movement-impedance mechanism after the mandrel has tripped and the mandrel hammer has moved into jarring or hammering contact with the barrel anvil.

Basic components of the jar tool

FIGURE 1, augmented by FIGURES 2a and 2b, illustrates the jar tool 1 disposed in a well bore 2, and its major components.

Jar tool 1 includes a generally tubular mandrel 3, telescopingly mounted within a barrel 4. Mandrel 3 is supported on a conduit string 5. Conduit string 5 extends upwardly to a well head (not shown). At this well head, the conduit string 5 is connected with a hoisting mechanism to enable a lifting force to be transmitted through the conduit string 5 to the mandrel 3.

Barrel 4 is connected at its lower end to a conduit portion 6. Conduit portion 6 extends downwardly to an article stuck, or temporarily lodged, within the well bore 2.

A generally annular, fluid filled reservoir 7 is interposed between the radially inwardly facing, generally cylindrical wall means 8 of the barrel 4 and the radially outwardly facing, generally cylindrical wall means 9 of the mandrel 3. The upper and lower ends of reservoir 7 are defined and closed by seal means 10 and 11 as illustrated. Seals 10 and 11 are carried by the wall means 8 of the barrel 4.

Relative rotation between the mandrel 3 and barrel 4 is prevented by a spline joint 12.

An annular, upwardly facing, ledge-like hammer 13 is carried by the mandrel 3. A downwardly facing, annular, generally ledge-like anvil 14 is carried by the barrel 4 above and in axial alignment with the hammer 13. Abrupt upward movement of the mandrel 3 brings the hammer 13 into jarring engagement with the anvil 14 so as to impart jarring strokes to the conduit portion 6, thereby tending to pull the stuck article upwardly.

Mandrel 3 includes an upwardly converging, frustoconical, shoulder-like piston means 15. Mandrel 3 also includes an annular abutment means 16 above frustoconical shoulder 15 and an annular ledge-like abutment 17 beneath this shoulder 15.

A generally cylindrical sleeve 18 is telescopingly and slidably mounted on the mandrel 3 between the shoulders or abutments 15 and 16. Sleeve 18 functions as a movement-impedance or pressure-generating mechanism with reservoir 7 to impede movement of mandrel 3. Axial movement of the sleeve 18 is limited by engagement of its upper and lower ends, respectively, with the abutments 16 and 17.

Sleeve 18 includes a lower portion 19 which is relatively thick, in radial cross-section, and which includes a radially inwardly facing frustoconical surface 20. This frustoconical surface 20 is operable to conformably and sealingly engage the mandrel surface or shoulder 15. Sleeve 18 also includes an upper, relatively thin-walled, cylindrical portion 21 displaced axially from and located above the thickened lower portion 19. In its unstressed condition, the outer cylindrical periphery 22 of the sleeve 18 is at least in part radially spaced from portion 23 of the wall means 8 of barrel 4 by something on the order of two thousandths of an inch.

Structural details

Structural details of the tool 1 are illustrated in FIGURES 2a and 2b.

As there shown, mandrel 3 includes an upper coupling portion 3a, threadably connected to an axially elongated, generally cylindrical, tubular portion 3b. Coupling portion 3a is connected to conduit string 5.

Barrel 4 is fabricated from a plurality of threadably interconnected, generally cylindrical portions 4a, 4b and 4c. A coupling portion 4d of barrel 4, attached to conduit portion 6, is threadably connected to barrel portion 4c as shown.

As illustrated, each of the seals 10 and 11 may be composite in character. Thus seal 10 may include an upper, annular groove 10a within which is contained an O-ring 10b. This O-ring is interposed axially between square-crossed sectioned rings 10c and 10d. Seal 10 also includes a lower, annular groove 10e within which are contained four axially adjacent O-rings identical to the O-ring 10b.

Seal 11, carried by removable seal portion 4c, in essence constitutes a mirror image of the upper seal means 10. With this arrangement, the pressure seal at the upper and lower ends of the reservoir 7 is provided by four axially adjacent O-rings. This seal arrangement is believed to minimize the extrusion of seal members which tends to occur at high pressures.

The spline joint 12 comprises longitudinally extended grooves 12a carried by mandrel 3. Slidably received within these grooves are longitudinally extending ridges 12b carried by the barrel 4.

It should be noted that downward telescopic movement of the mandrel 3 is limited by abutting engagement of an annular mandrel ledge 24 with an annular barrel ledge 25. Upward, telescoping movement of the mandrel is limited by engagement of hammer 13 with the anvil 14.

The interior of barrel 4 is recessed above cylindrical surface 22. This recess 26 extends axially above surface 23 to anvil 14.

As illustrated in FIGURE 2b, the upper end of cylindrical portion 21 of sleeve 18 may be radially thickened and provided with axially extending opening means of generally axially extending port means 27.

Upper abutment 16 is defined by an annular row of circumferentially spaced teeth 16a. These teeth abuttingly engage the upper end of sleeve 18.

Lower abutment 17 is axially adjustable in character. Abutment 17 is defined by a smooth, annular, circumferentially continuous end 17a of a nut 17b which is threadably mounted on mandrel 3. A set-screw 17c may be employed to secure the nut 17b in a desired axial position.

As will be understood the axial positioning of the nut 17b will determine the axial positioning of the sleeve 18, when this sleeve is displaced downwardly into abutting engagement with the surface 17a.

As shown in FIGURE 2b, an annular recess 28 is formed in mandrel 3, radially adjacent and inwardly of the abutment 17a. Communication between the recess 28 and the reservoir 7 radially opposite the adjusting nut 17, is provided for through one or more radially extending ports 17d formed in the nut 17b.

The components of the tool 1 are arranged so as to provide a continuous fluid reservoir extending between the seals 10 and 11. The spline joint components 12a and 12b are loosely fitted so as to not destroy the axial continuity of the reservoir 7.

It is contemplated that the reservoir 7 should desirably be completely filled with a high quality hydraulic fluid such as an oil designated HB 3520 commercially available through Union Carbide Chemicals.

In field tested tool the thickness of the thin-walled sleeve portion 21 is on the order of $9/1000$ of an inch, with the thickness of the adjacent barrel wall being on the order of $32/100$ of an inch. The taper angle of the surfaces 15 and 20 should be on the order of $1\frac{1}{2}$ to 5 degrees, measured with respect to a vertical axis. The sleeve 18 and barrel 4 should be radially distensible, in response to fluid pressure contained within the reservoir 7. Sleeve 18 and barrel 4 may be fabricated of steel and provide this desired distensibility.

The inner surface 23 of the barrel 4 should be more wear-resistant than the outer surface of sleeve 18. This insures that the sleeve will wear in preference to the cylinder wall. When such wear occurs, the relatively inexpensive sleeve may be easily removed and reinstalled. This preferential wear characteristic may be accomplished by plating the sleeve surface 22 with nickel plating such as Kanigen, and plating the inner surface 23 of the barrel 4 with chrome.

*Operation of components during initial portion of upward stroke*

FIGURE 3a illustrates the disposition of tool components at the commencement of an upward stroke after the mandrel 3 has been moved downwardly at the conclusion of a previous jarring stroke.

As shown in FIGURE 3a, the sleeve 18 is in its upper position engaged with the teeth 16a of the abutment 16. This upper positioning of the sleeve 18 results from frictional engagement of the sleeve 18 with the barrel surface 23 during the down stroke of the mandrel 3. The viscosity of the oil in the reservoir 7 virtually insures the existence of frictional interaction between the sleeve 18 and the barrel wall 23 so as to produce this upward sleeve movement relative to the mandrel 3.

At the commencement of the up stroke, an upward force is imposed at the well head on the conduit string 5. This upward force is transmitted through the mandrel 3 to the surface 15. The mandrel moves upwardly, with upward sleeve movement being resisted by the frictional interaction between the sleeve and the barrel wall. When the mandrel surface 15 abuttingly engages the sleeve surface 20, an imperfect but reasonably effective seal is provided by the sleeve 18 between the mandrel surface 15 and the barrel surface 22. This seal is sufficient to enable low level pressure to be generated within the reservoir 7 above the movement-impeding sleeve 18.

In response to the attainment of this low level pressure, thin-walled portion 21 of the sleeve 18 distends radially outwardly to force the sleeve surface 22 into tight sealing engagement with the barrel surface 23. This distention occurs as a result of a pressure differential acting radially across the wall of the sleeve portion 21. This pressure differential exists because of the gap 29 between the surfaces 22 and 23, in contrast to the seal between surfaces 15 and 20 beneath the recess 30. This recess of reservoir 7 exists between the sleeve portion 21 and a cylindrical mandrel surface portion 31. Recess 30 communicates with the remainder of reservoir 7 by way of sleeve opening means 27 and the spaces between teeth 16a.

FIGURE 3b illustrates the sleeve 18, after the sleeve portion 21 has been distended so as to cause the sleeve surface 22 to sealingly and conformingly engage the barrel surface 23.

As shown in FIGURE 3b, as a result of this sleeve distention, even the relatively thick sleeve portion 19 has distended so as to enable this portion to abuttingly engage the lower mandrel abutment surface 17a.

In this connection, it should be understood that with no pulling force exerted on the mandrel 3, the sleeve 18, when in its lowermost position, will abuttingly engage the surface 15 prior to engagement of the lower sleeve end with the surface 17a. This insures that movement of the sleeve 18 into engagement with the abutment surface 17a will always yield an effective seal between the mating frustoconical surfaces 15 and 20.

Thus, in response to the initial pull exerted on the mandrel 3 sufficient to generate low pressure within the reservoir 7, the sleeve 18 has distended radially so as to produce the FIGURE 3b condition where the sleeve 18 effectively seals between the barrel and mandrel. In this connection it will be recognized that some limited mandrel movement will occur, in spite of this seal, because of leakages occasioned by necessary manufacturing tolerances.

*Upward stroke under high force*

The continued application of pulling force to the mandrel 3, with the sleeve 18 disposed in its sealing position as shown in FIGURE 3b, will intensify or increase the pressure of fluid within the reservoir 7. In field practice, pulling forces on the mandrel 3 of a magnitude of 40,000 pounds have been successfully effected. Such a high pulling force is possible because of the effective impedance afforded by the sealing action of the sleeve 18. This high pulling force, when attained, will generate high fluid pressure within the reservoir 7 above the sleeve 18. Thus, in a sense, sleeve portion 19 may be viewed as a fluid pressure-generating mechanism which cooperates, in its FIGURE 3b position, with the mandrel surface 15 to generate high pressure within the reservoir 7.

After the pulling on the mandrel has been continued to the point of developing the desired high pulling force, the pressure within the reservoir will reach such a high level as to distend the sleeve 18 and adjacent wall portion of the barrel 4 radially outwardly. (It is also possible this pressure may contract the mandrel 3 and its surface 15.) This distention, shown in FIGURE 3c, yields a frustoconical, restricted passageway 32 between the surfaces 15 and 20. This restricted passageway 32, which has a progressively diminishing cross-sectional area in an upward direction, provides communication between the ends of the reservoir 7 on opposite ends of the sleeve 18. The existence of this restricted passageway enables relatively slow movement of the mandrel 3 to take place under a high pulling force.

Because of the pressure-responsive nature of the existence of the passage 32, a desired rate of mandrel movement will continue only so long as enough pulling force is applied to the mandrel to generate high pressure within the reservoir 7 so as to distend both the sleeve and barrel radially outwardly and produce the passage 32.

In this connection, it will be understood that the selective axial positioning of the abutment 17a, effected by rotating the adjusting nut 17b, will determine the size of the restricted passage 32 and thus the level of the pulling force which may be exerted upon the mandrel 3. In other words, the greater the resistance provided by the passage 32 the greater the pulling force which may be transmitted to the mandrel 3. Thus, for example, should the abutment 17a be moved upwardly from its position shown in FIGURE 3c, a lower maximum pulling force would be produced. This would result because less distention of the sleeve and barrel would be required to produce the same cross-sectional area for the passage 32 in relation to that required in the FIGURE 3c positioning of components.

Here again, it will be recognized that the basic mode of operation of the jar tool entails a dashpot effect, with the sleeve 18 and mandrel shoulder 15 functioning as a "leaking" piston so as to impede, but nevertheless permit, movement of the mandrel 3 through the fluid reservoir 7. While such movement is taking place, fluid may flow through the passage 32 from the top of the sleeve to beneath the sleeve. Pressure communication between the lower portion of the reservoir 7, beneath the sleeve 18, and the restricted passageway 32 is provided by the recess 28 and the ports 17d.

*Tripping of jar tool and impact of hammer*

The continued application of high pulling force to the mandrel 3 serves to move the mandrel 3 slowly upwardly until the sleeve 18 enters the recess 26 as shown in FIGURE 3d.

As the thin-walled sleeve portion 21 enters the recess 26, the seal between the sleeve and the barrel 4 will be drastically impaired, but probably not altogether destroyed, in view of the imperfect seal between the thicker and thus less elastic lower end portion 19 of the sleeve and the barrel wall. Thus the mandrel 3 will begin to move more rapidly as soon as the sleeve portion 21 enters the recess 26. At the point where the sleeve portion 19 enters the barrel recess 26, fluid will be able to bypass completely around the outside of the sleeve 18 as shown in FIGURE 3d. This will cause the barrel to contract and the sleeve to contract, and enable the mandrel 3 to move relatively unimpeded and thus rapidly upwardly. At this point it should be recognized that the contraction of the sleeve 18 will bring the surface 20 into snug engagement with the surface 15.

At the end of the upward stroke of the mandrel 3 the hammer 13 will engage the anvil 14 and deliver a sharp, upwardly directed blow to the barrel 4. This blow will be transmitted through the barrel 4 and conduit portion 6 to the article stuck in the well bore.

The impact of the hammer and anvil will serve to jolt the sleeve 18 free of contracted engagement with the surface 15.

The mandrel may then be lowered to restore the components to their FIGURE 3a position in preparation for a succeeding jarring stroke.

As will be recognized, the downward movement of the mandrel is substantially unimpeded by the sleeve 18. Fluid acting on the lower end of the sleeve 18 during the downward stroke will tend to move the sleeve 18 upwardly and provide a large flow passage 32 of nominal dashpot consequence.

At this point, it seems appropriate to summarize the manner in which the pressure-generating and movement-impeding sleeve 18 is uniquely supported on the mandrel 3.

At the commencement of mandrel movement, and in response to the generation of low pressure within the reservoir 7, the sleeve 18 is elastically and yieldably expanded so as to bring the surface 22 into sealing engagement with the surface 23 and the surface 20 into sealing engagement with the surface 15. With the sleeve 18 in this position, as illustrated in FIGURE 3b, the sleeve portion 18 is contractible, in response to a pressure reduction within the reservoir 7. This contraction would bring the surface 20 into tighter engagement with the surface 15.

As the pressure of fluid within the reservoir 7 increases, the surface 19 expands away from the mandrel surface 15. The sleeve 18 and mandrel portion 15 are then moved together upwardly through the reservoir 7 as illustrated in FIGURE 3c. When the sleeve 18 enters the barrel recess 2c, the pressure within the reservoir 7 above the sleeve 18 is reduced. In response to this pressure reduction, the sleeve portion 19 contracts into tight-fitting engagement with the mandrel portion 15. The sleeve portion 19 is jarred free from the mandrel shoulder 15 in response to jarring engagement of the hammer 13 with the anvil 14.

*Summary of advantages and scope of invention*

A prime advantage of the invention resides in utilizing the thin-walled cylindrical portion of the sleeve to effectively seal against the barrel wall. This enables the frustoconical passage, when developed, to effectively control mandrel movements.

By initially improving the seal between the mandrel and barrel when pulling force is applied, it is possible to generate and maintain high pulling force with the jar tool. In other words, by impeding mandrel movement to the maximum extent at the start of the stroke, it is possible to achieve a high pulling force before the length of the stroke has been expended. This of course makes it possible to provide an effective jar tool of unusual short length.

The preferential wear relationship between the sleeve and cylinder, which assures primary wear on the sleeve, contributes to improved tool maintenance. Instead of having to replace an expensive barrel, a field operator may merely disassemble the tool and conveniently reinstall a new sleeve.

The continuous annular character of the lower, mandrel abutment provides a maximum reaction surface engageable with the lower end of the sleeve. This tends to more evenly distribute forces acting on the sleeve during the upstroke of the mandrel so as to maximize sleeve life and minimize the chances of localized sleeve deformation.

The ability of the sleeve to contract into tight-fitting engagement with the mandrel shoulder insures effective sealing between these elements while pressure is being generated.

In describing the invention, reference has been made to a preferred embodiment. However, those skilled in the jar tool art and familiar with this disclosure may well envision additions, deletions, substitutions or other modifications which would fall within the scope of the invention as set forth in the appended claims.

I claim:
1. In a hydraulic jarring tool for use in a well, an improved mechanism for maintaining fluid pressure within a body of fluid contained by the tool and serving to impede the telescoping movement of tool components, said mechanism comprising:
   a first member;
   a second member telescopingly mounted in relation to said first member;
   fluid reservoir means contained between the said first and second members;
   piston means carried by one of said members;
   first, radially and elastically yieldable wall means within said reservoir means and operable to distort radially in response to the attainment of a relatively high fluid pressure within said reservoir means;
   second, radially and elastically yieldable wall means carried by said piston means in telescoping relation with said one of said members and operable to distort radially into sealing engagement with the others of said members in response to the attainment of relatively low fluid pressure within said reservoir means; and pressure generating means carried by said piston means and connected with said second wall means, said pressure generating means being operable to sealingly engage said piston means when exposed to said relatively low fluid pressure and separate from said piston means in response to the attainment of said relatively high fluid pressure and said distortion of said first wall means to define restricted passage means communicating with opposite ends of said piston means within said reservoir means.

2. In a hydraulic jarring tool for use in a well, an improved mechanism for maintaining fluid pressure within a body of fluid contained by the tool and serving to impede telescoping movement of tool components, said mechanism comprising:

a first member;
a second member telescopingly mounted in relation to said first member;
fluid reservoir means contained between the said first and second members;
piston means carried by one of said members;
first, radially distensible wall means carried by the other of said members and operable to distort radially in response to the attainment of a relatively high fluid pressure within said reservoir means;
second, radially distensible wall means carried by said piston means in telescoping relation with said first wall means and operable to distort radially into sealing engagement with said first wall means in response to the attainment of relatively low fluid pressure within said reservoir means; and
pressure generating means carried by said piston means and connected with said second wall means, said pressure generating means being operable to sealingly engage said piston means when exposed to said relatively low fluid pressure and distort away from said piston means in response to the attainment of said relatively high fluid pressure to define restricted passage means communicating with opposite ends of said piston means within said reservoir means.

3. In a hydraulic jarring tool for use in a well, an improved mechanism for maintaining fluid pressure within a body of fluid contained by the tool and serving to impede telescoping movement of tool components, said mechanism comprising:

a barrel member;
a mandrel member telescopingly mounted within said barrel member;
annular, fluid reservoir means contained between the said mandrel and barrel members;
frustoconical piston means carried by said mandrel member;
first, radially distensible, cylindrical wall means carried by said barrel member and operable to distort radially in response to the attainment of a relatively high fluid pressure within said reservoir means;
second, radially distensible, cylindrical wall means carried by said piston means in telescoping relation with said first wall means and operable to distort radially into sealing engagement with said first wall means in response to the attainment of relatively low fluid pressure with said reservoir means; and
pressure generating sleeve means carried by said piston means and connected with said second wall means, said pressure generating means including frustoconical surface means operable to sealingly engage said piston means when exposed to said relatively low fluid pressure and distort away from said piston means in response to the attainment of said relatively high fluid pressure to define restricted frustoconical passage means communicating with opposite ends of said piston means within said reservoir means.

4. In a hydraulic jarring tool for use in wells, an improved mechanism for maintaining fluid pressure within a body of fluid operable to restrict movement of telescoping components of said tool, said mechanism comprising:

barrel means;
mandrel means telescopingly mounted within said barrel means;
radially inwardly facing cylindrical well means carried by said barrel means;
radially outwardly facing wall means carried by said mandrel means;
said wall means of said barrel means and mandrel means being radially spaced to define at least a portion of a generally annular cavity;
plural sealing means positioned between the wall means of said barrel means and the wall means of said mandrel means and separated axially of said annular cavity to define and close the ends thereof;
generally frustoconical surface means carried by said mandrel means and facing radially outwardly thereof;
plural abutment means carried by said mandrel means and axially displaced thereon;
radially distensible sleeve means carried by said mandrel means, said sleeve means being slidably mounted on first mandrel means between said abutment means;
said sleeve means including outwardly facing cylindrical surface means spaced, at least partially, radially inwardly of said cylindrical wall means of said barrel means when said sleeve means is not stressed;
said sleeve means further including radially inwardly facing, frustoconical surface means sealingly engageable with said frustoconical surface means of said mandrel means when said sleeve means is unstressed;
said frustoconical surface means of said sleeve means and said frustoconical surface means of said mandrel means being radially spaced to define a generally frustoconical passageway when said sleeve means and barrel means are distended radially outwardly, with said sleeve means being engaged with one of said abutment means;
said sleeve means including an axially extending, radially inwardly facing recess displaced axially from the frustoconical surface means of said sleeve means and lying radially adjacent a relatively thin-walled, axially extending portion of said sleeve means.

5. A mechanism as described in claim 4:
wherein at least one of said radially inwardly facing wall means of said barrel means and the radially outwardly facing surface means of said sleeve means is surface treated to provide a relatively more wear-resistant surface on the wall means of said barrel means.

6. An apparatus as described in claim 4:
wherein said mandrel means includes an annular recess interposed radially inwardly of said one of said abutment means; and
wherein said one abutment means includes port means extending from said annular recess to the exterior of said mandrel means, with said one abutment means being interposed between said port means and said sleeve means, said one abutment means further including continuous, annular rim means abuttingly engageable with said sleeve means.

7. An apparatus as described in claim 4:
wherein said mandrel means includes an annular recess interposed radially inwardly of said one of said abutment means;
wherein said one abutment means includes port means extending from said annular recess to the exterior of said mandrel means, with said one abutment means being interposed between said port means and said sleeve means, said one abutment means further including continuous, annular rim means abuttingly engageable with said sleeve means; and wherein the radially outwardly facing surface means of said sleeve means is surface treated to provide a relatively more wear-resistant surface than the wall means of said barrel means.

8. A method of supporting a pressure generating and movement impedance device within the fluid reservoir of a hydraulic jar tool, said method comprising:

elastically and yieldably expanding a portion of a pressure generating device within a fluid reservoir of a hydraulic jar tool;

sealingly engaging said expanded portion of said pressure generating device with a movable component of said jar tool, with said portion being contractible into tighter engagement with said component in response to a reduction of pressure within said reservoir;

increasing the pressure of fluid within said reservoir and, in response to said pressure increase, separating said portion of said pressure generating device away from said component;

moving said component and separated portion through a portion of said reservoir;

reducing the pressure within said reservoir and, in response to said pressure reduction, contracting said portion into tight fitting engagement with said component; and jarring said portion free of said tight fitting engagement.

References Cited

UNITED STATES PATENTS

| | | | |
|---|---|---|---|
| 2,645,459 | 7/1953 | Sutliff | 175—297 |
| 3,005,505 | 10/1961 | Webb | 175—297 |
| 3,285,353 | 11/1966 | Young | 175—297 |

JAMES A. LEPPINK, *Primary Examiner.*

UNITED STATES PATENT OFFICE
CERTIFICATE OF CORRECTION

Patent No. 3,429,389                                        February 25, 1969

Burchus Q. Barrington

It is certified that error appears in the above identified patent and that said Letters Patent are hereby corrected as shown below:

In the heading to the printed specification, lines 5 and 6, "c/o Halliburton Company, P. O. Drawer 1431, Duncan, Okla. 73533" should read -- Duncan, Okla., assignor to Halliburton Company, Duncan, Okla., a corporation of Delaware --.

Signed and sealed this 31st day of March 1970.

(SEAL)
Attest:

Edward M. Fletcher, Jr.

Attesting Officer

WILLIAM E. SCHUYLER,
Commissioner of Pate